US012804701B2

(12) United States Patent
Lang et al.

(10) Patent No.: US 12,804,701 B2
(45) **Date of Patent: *Nov. 17, 2026**

(54) INTELLIGENT ANTENNA ADAPTIVE DIRECTED BEAMFORMING BASED ON TOTALITY OF CIRCUMSTANCES

(71) Applicant: AT&T Intellectual Property I, L.P., Atlanta, GA (US)

(72) Inventors: Howard Lang, Wayside, NJ (US); Joseph Soryal, Glendale, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 215 days.

This patent is subject to a terminal disclaimer.

(21) Appl. No.: 18/735,384

(22) Filed: Jun. 6, 2024

(65) Prior Publication Data

US 2024/0324002 A1 Sep. 26, 2024

Related U.S. Application Data

(63) Continuation of application No. 17/737,257, filed on May 5, 2022, now Pat. No. 12,035,355.

(51) Int. Cl.

| | |
|---|---|
| ***H04W 72/566*** | (2023.01) |
| ***G06V 40/16*** | (2022.01) |
| ***H04W 4/90*** | (2018.01) |
| ***H04W 16/28*** | (2009.01) |

(52) U.S. Cl.

CPC ........ *H04W 72/566* (2023.01); *G06V 40/174* (2022.01); *H04W 4/90* (2018.02); *H04W 16/28* (2013.01)

(58) Field of Classification Search

CPC ..... H04W 72/566; H04W 4/90; H04W 16/28; G06V 40/174

USPC ........................................................ 455/404.1

See application file for complete search history.

(56) References Cited

U.S. PATENT DOCUMENTS

| | | | | |
|---|---|---|---|---|
| 11,647,374 | B2 | 5/2023 | Malboubi et al. | |
| 2002/0147032 | A1 | 10/2002 | Yoon et al. | |
| 2007/0191053 | A1 | 8/2007 | Suzuki et al. | |
| 2007/0287473 | A1* | 12/2007 | Dupray | H04W 4/029 455/456.1 |
| 2009/0325538 | A1 | 12/2009 | Sennett et al. | |
| 2010/0279648 | A1 | 11/2010 | Song et al. | |
| 2014/0118140 | A1* | 5/2014 | Amis | G08B 25/08 340/539.13 |
| 2014/0329485 | A1* | 11/2014 | Calin | H04L 63/1475 455/296 |
| 2016/0373935 | A1* | 12/2016 | Smith | H04W 16/14 |

(Continued)

*Primary Examiner* — Maria El-Zoobi

(74) *Attorney, Agent, or Firm* — Guntin & Gust, PLC; Miyoung Shin

(57) ABSTRACT

Aspects of the subject disclosure may include, for example, assessing a priority of a particular user at a service area in a mobile communications network for a strong radio signal from a cell site of the mobile communications network, and providing the strong radio signal to a mobile device of the particular user according to the priority of the particular user, wherein the providing the strong radio signal comprises focusing an antenna beam of a beamforming antenna at the service area and assigning the antenna beam to the particular user for downlink communication between the cell site of the mobile communications network and the particular user. Other embodiments are disclosed.

20 Claims, 9 Drawing Sheets

(56) References Cited

U.S. PATENT DOCUMENTS

| | | | | |
|---|---|---|---|---|
| 2017/0285594 | A1* | 10/2017 | Stewart ................ | G05B 13/024 |
| 2021/0409335 | A1 | 12/2021 | Zhu et al. | |
| 2023/0362974 | A1 | 11/2023 | Lang et al. | |

* cited by examiner

FIG. 2C
254
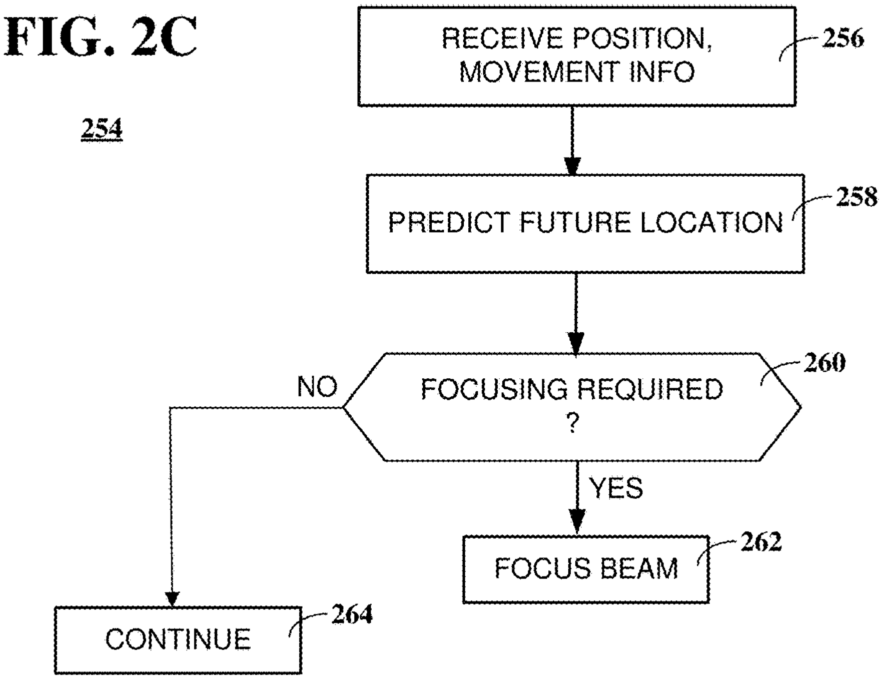
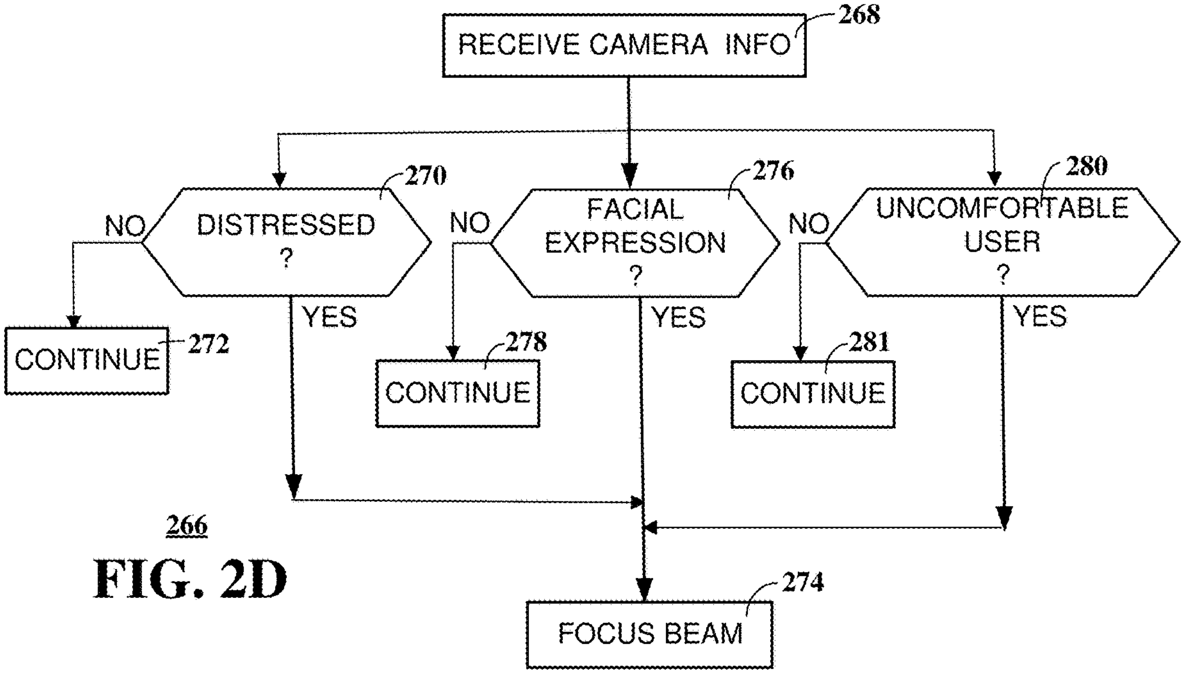
266
FIG. 2D

282

292

300

600

INTELLIGENT ANTENNA ADAPTIVE DIRECTED BEAMFORMING BASED ON TOTALITY OF CIRCUMSTANCES

CROSS-REFERENCE TO RELATED APPLICATIONS

This application is a continuation of and claims priority to U.S. application Ser. No. 17/737,257, filed May 5, 2022. All sections of the aforementioned application(s) and/or patent (s) are incorporated herein by reference in their entirety.

FIELD OF THE DISCLOSURE

The subject disclosure relates to a system and method for an intelligent antenna adaptive directed beamforming based on a totality of circumstances.

BACKGROUND

Next generation antennas for mobile devices and mobility networks will employ beamforming technology. Such beamforming technology focuses transmission energy on locations that most need the energy for a reliable radio link. Current beamforming technology utilizes one or few parameters such as the user's location and user density.

BRIEF DESCRIPTION OF THE DRAWINGS

Reference will now be made to the accompanying drawings, which are not necessarily drawn to scale, and wherein:

FIGS. 2B-2F depict an illustrative embodiment of methods in accordance with various aspects described herein.

DETAILED DESCRIPTION

The subject disclosure describes, among other things, illustrative embodiments for performing a situational analysis to control focusing an antenna beam of a beamforming antenna. Rather than using just the location of a mobile device for beamforming, the totality of circumstances at a location is analyzed to activate and shape beamforming at a cell site of a mobile communications network. Other embodiments are described in the subject disclosure.

One or more aspects of the subject disclosure include identifying a requirement for mobile communication resources in a service area of a mobility network, determining the requirement for mobile communication resources exceeds currently available mobile communication resources of the mobility network for the service area, assessing current user status information for one or more users in the service area, forming a user assessment, wherein the assessing current user status information is based on the determining the requirement for mobile communication resources exceeds currently available mobile communication resources, and assigning an antenna beam of a beamforming antenna based on the user assessment.

One or more aspects of the subject disclosure include identifying a high-priority user at a service area of a mobile communications network, the service area being served by a cell site of the mobile communications network, the high-priority user being a subscriber to mobile communication services on the mobile communications network, wherein the identifying the high-priority user is responsive to a determination that a demand for mobile communication resources exceeds an amount of available mobile communication resources, and wherein the identifying the high-priority user is responsive to a totality of circumstances analysis of activities at the service area of the mobile communications network, and assigning an antenna beam of a beamforming antenna for downlink communication between the cell site of the mobile communications network and a mobile device of the high-priority user.

One or more aspects of the subject disclosure include assessing a priority of a particular user at a service area in a mobile communications network for a strong radio signal from a cell site of the mobile communications network, and providing the strong radio signal to a mobile device of the particular user according to the priority of the particular user, wherein the providing the strong radio signal comprises focusing an antenna beam of a beamforming antenna at the service area and assigning the antenna beam to the particular user for downlink communication between the cell site of the mobile communications network and the particular user.

Figure 1:
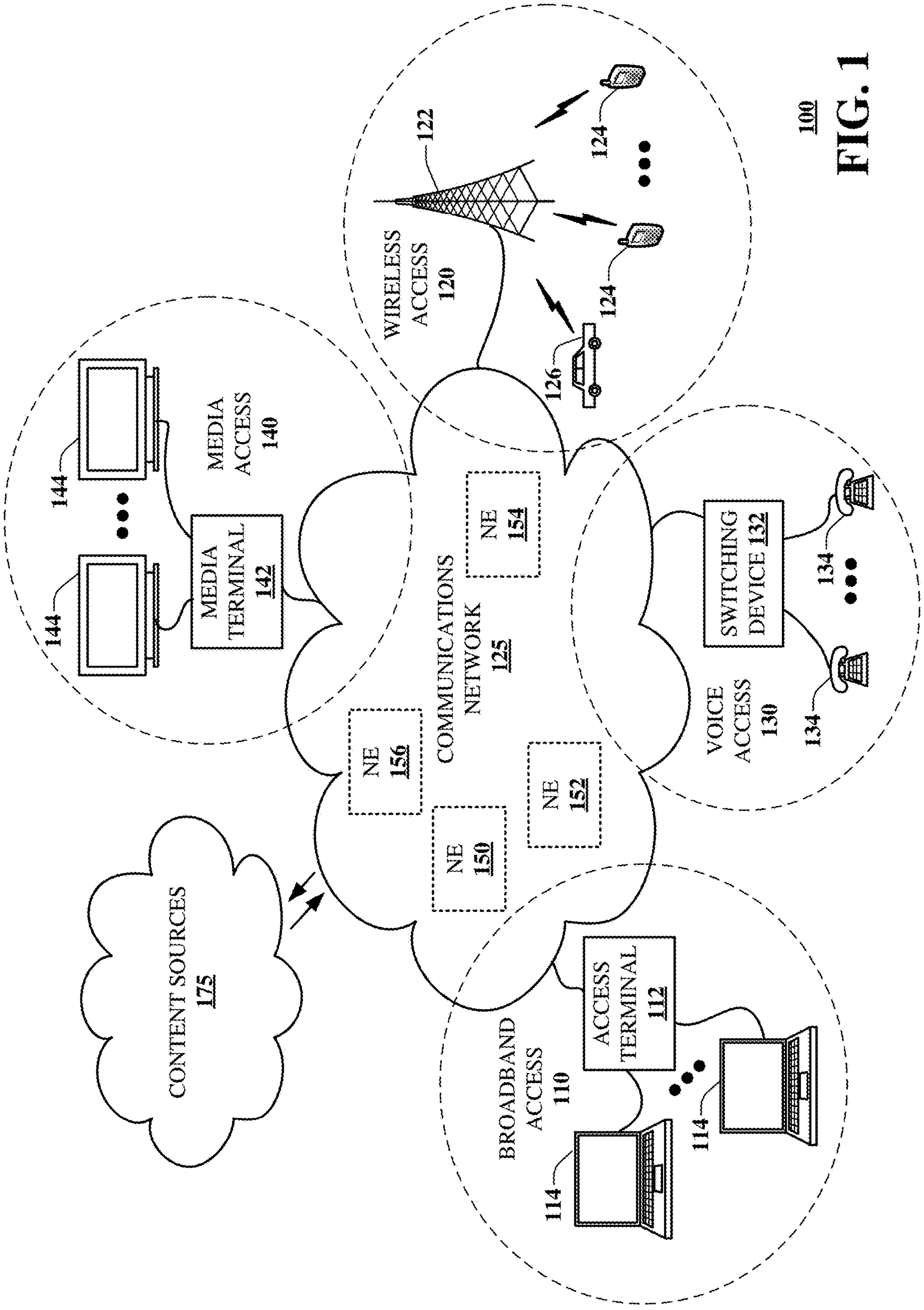
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part activating and shaping antenna beamforming at a cell site of a mobility network based on a totality of circumstances that are pertinent to the location and users in the mobility network. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP)

network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
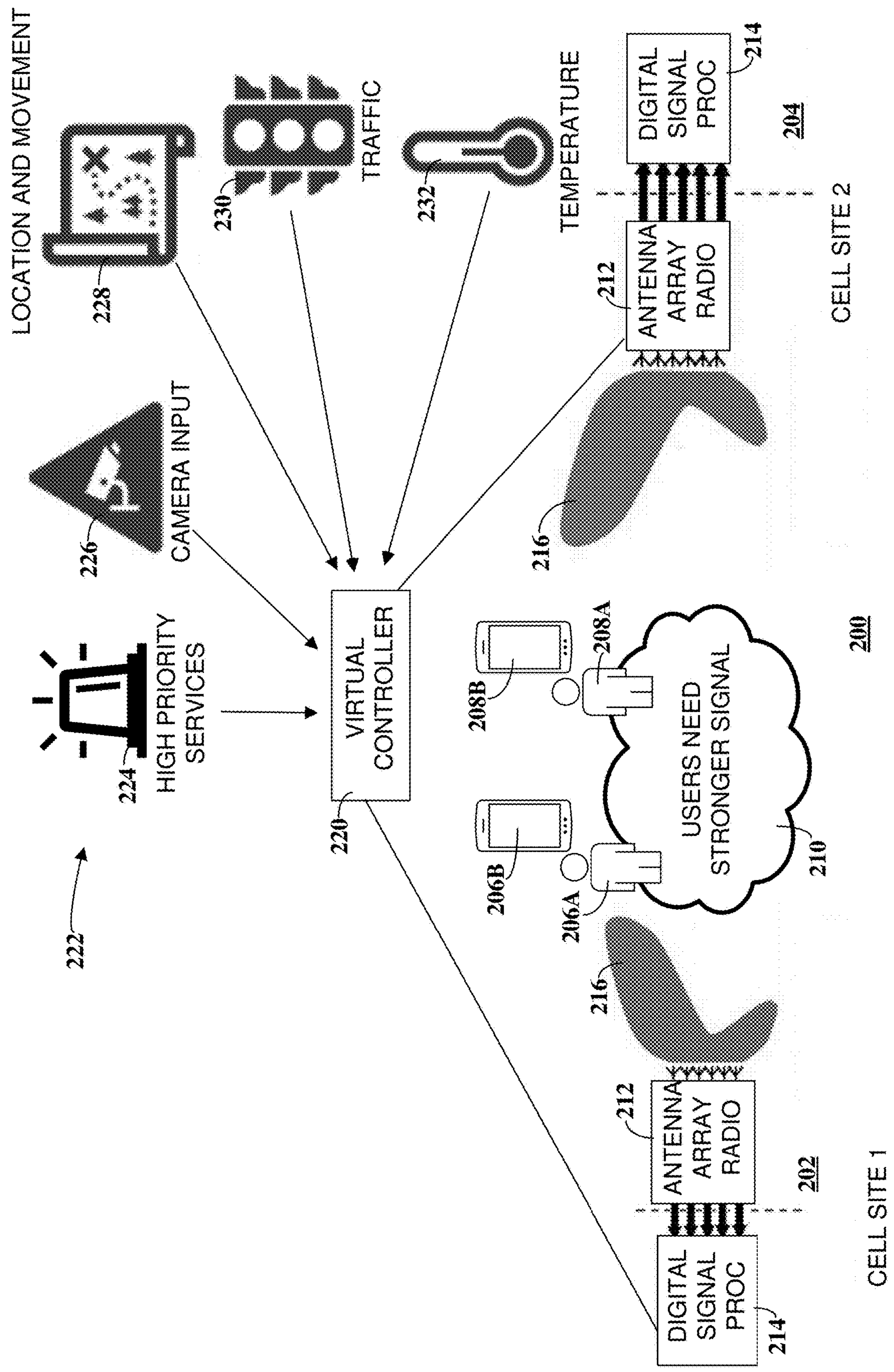
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. In an example, the system 200 may be a portion of a mobility network or wireless access network such as wireless access 120 shown in FIG. 1. The system 200 includes in this exemplary embodiment a first cell site 202 and a second cell site 204. Each of the first cell site 202 and the second cell site 204 may include or be part of a base station or access point such as base station or access point 122 of wireless access 120 in FIG. 1. Each base station or access point can include a 4G, 5G, or higher generation base station. Each base station of the first cell site 202 and second cell site 204 provides radio communication and network access to devices such as first mobile device 206B operated by first user 206A and second mobile device 208B operated by second user 208A. The first mobile device 206B and the second mobile device 208B operate in a service area 210. Each respective cell site provides coverage to a respective service area. Service area 210 may represent one respective service area or an overlap area where first mobile device 206B and second mobile device 208B have radio contact with both the first cell site 202 and the second cell site 204. This may be done, for example, to enable handover of radio communications with a mobile device from the first cell site 202 to the second cell site 204 to provide mobility for the mobile device.

In embodiments, each of the first cell site 202 and the second cell site 204 includes a beamforming antenna system. Each respective beamforming antenna system include an antenna array radio 212 driven by a digital signal processing system 214. The beamforming antenna system produces a beam 216 of radio frequency energy for radio communication with mobile devices such as first mobile device 206B and second mobile device 208B in the service area 210. The beam 216 may have any suitable shape as produced by the antenna array radio 212 so that the beam 216 can have some or all of its energy focused on a desired location in the service area 210. The beam 216 is on the downlink from a cell site to user equipment such as the first mobile device 206B and the second mobile device 208B.

The beamforming antenna system is operable to focus the energy from the antenna to a specific location. It is desirable to focus the energy selectively and intelligently at a specific location, where users such as first user 206A and second user 208A associated with mobile devices such as first mobile device 206B and second mobile device 208B in the service area 210 are most in need of the energy, such as a stronger signal or a signal with relatively high received signal strength. Beamforming enables users associated with mobile devices to have the best experience possible with the strongest radio signal and most reliable radio communication. Conventional cellular base station antennas provide broad coverage to, for example, a sector having 120 degrees of arc in a circle around the cell site. This broad coverage is provided without regard to presence or absence of user equipment in the sector. If no user devices are located in the sector, the energy provided by the antenna is in effect wasted.

Beamforming in this manner is used in fifth generation (5G) cellular and will be prevalent in future generations such as sixth generation (6G) cellular system. Further, 5G cellular systems are generally focused on devices. For example, in a conventional 5G system, if a user's device experiences a weak signal from a base station or cell site, the cell site will use beamforming to direct additional energy to that user's device. The weak signal may be reflected, for example, in excessive packet loss reported by the user's device to the cell site.

In 6G cellular systems, there will be more of a focus on persons, including a user's behavior and perceptions, going beyond the devices in the users' hands to the users themselves. The experience a user has with the system and in the user's life will take on greater importance in future cellular systems. For example, if a user is seen by a camera and artificial intelligence system to be on a street in apparent distress and using a mobile device to place a call, a system and method in accordance aspects described herein will use beamforming to direct additional energy to that user's device. That user is assumed to have a heightened need for fast, reliable communication service and is therefore give priority by directing a beam in that user's direction. That user has behavior that indicates that user may need a stronger signal than another user nearby.

Conventional beamforming systems are based on users' locations and swarming. Swarming pertains to having a relatively large number of users in a particular location. However, it does not address relative priority of users, either users in the same location or in other locations served by the same base station or cell site. Further, such conventional beamforming systems do not take into account a user's particular circumstances. As noted, future radio systems such as 6G cellular will have a greater focus on user experience based on the user's circumstances. The circumstances of users may be automatically analyzed to prioritize the communication needs of the users. The energy available for downlink transmissions is a limited resource and the limitation may mean that some areas with lower priority get lower signal strength. For example, if first responders are handling an emergency situation, they should be prioritized for reliable, high-speed communication, and that may involve automatically directing beams to the first responders for a time. The first responders may have a stronger need to communicate. A system and method in accordance with some aspects herein will ensure that the first responders have the radio resources needed to make that communication.

In embodiments, a user status is evaluated when the demand for mobile communication resources exceeds the amount of currently available mobile communication resources. For example, if a relatively large number of users are in a common area, the mobile communication network may not be able to supply enough radio signal to all users to accommodate the current demand of those users for mobile communication resources, where mobile communication resources include items like bandwidth, throughput, higher-rate speech codecs, and antenna beams from beamforming antennas. There is a need to prioritize users or user devices and decide by the network which user devices should receive additional mobile communication resources and which user devices should be temporarily denies access to some mobile communication resources, such as bandwidth for data downloads or access to higher-rate speech codecs.

In many cases, it is not feasible to simply increase transmit power from a cell site. Government regulatory authorities such as the Federal Communications Commission in the United States limit transmit power in many cases. Additional transmit energy may create interference with other channels. A given radio in a cell site may be physically limited in the transmit power the radio can generate. The beamforming antenna system operates to focus the transmit power to selected users based on priority.

The exemplary embodiment of FIG. 2A shows beamforming and beam transmission by a base station at a cell site such as first cell site 202 and second cell site 204 to a user such as first mobile device 206B and second mobile device 208B. In other embodiments, the beamforming and beam transmission may be performed by peer devices. For example, two automobiles may be in data communication. In the example, a first car may detect that a second car seems to be out of control or swerving or in some distress. The first car may determine that the second car may need some help in the moment to send a signal for communication for assistance or for any other reasons.

The system 200 further includes a virtual controller 220 along with a plurality of input devices which may be referred to as sensors 222. In the example embodiment, the sensors 222 include a controller 224 for high priority services, camera equipment 226, a location and movement sensing equipment 228, traffic sensing equipment 230 and temperature sensing equipment 232. Other embodiments may include other types of sensors or data collection devices or data processing devices.

The virtual controller 220 receives input information from the sensors 222 and provides beamforming information base stations at cell sites of a mobility network such as first cell site 202 and second cell site 204. The virtual controller 220 uses the input information from the sensors 222 to identify a user, such as first user 206A with first mobile device 206B or second user 208A with second mobile device 208B, that needs a higher quality communication link such as one offering reduced packet loss, higher data rates or higher reliability. The virtual controller 220 provides beamforming control information to one or more base stations, such as first cell site 202 and second cell site 204, to cause the one or more base stations to control beamforming for the identified user to provide the high-quality communication link.

In accordance with various aspects described herein, the virtual controller 220 does a comprehensive situational analysis of users and user devices. The virtual controller 220 does not look at a single factor, such as packet loss. Rather, the virtual controller looks at a full, comprehensive set of inputs to take in the overall situation in order to decide where the antenna energy should be focused, or what is the most important location to direct a beam toward by a cell site or base station. Focusing the beam to an area includes a consideration of the totality of activities in an area or at a specific location.

The virtual controller 220 may be located in any suitable location, such as at a base station or cell site of the mobility network, at a core element of the mobility network, at an edge cloud server in communication with one or more components of the mobility network. In embodiments, the virtual controller 220 includes a processing system including one or more processors, memory and a communication interface. The memory stored data and instructions for controlling the virtual controller including the processors. The communications interface is configured to communicate with the sensors 222 and the one or more base stations or cell sites such as first cell site 202 and second cell site 204. Data may be in any suitable format such as transmission control protocol/internet protocol (TCP/IP) packets.

The controller 224 for high priority services collects information about activities in an area such as the service area 210 that may require a high priority for communications or the highest priority for communications. Examples include first responder personnel. First responders include those whose job is to respond immediately when there is an accident or emergency situation affecting people or property. Examples include persons such as police personnel and fire personnel; medical personnel such as emergency medical technicians (EMTs), emergency doctors and nurses, and paramedics; utility workers such as electric line maintenance workers; and public health personnel. First responders generally have specialized training and are among the first to arrive and provide assistance at an emergency scene such as an accident, a natural disaster or terrorist incident. The controller 224 for high priority services may collect information from emergency communications, such police and fire radios, for example, to identify situations that require first responder participation.

The controller 224 for high priority services may further have access to dedicated high priority communication systems. For example, the First Responder Network Authority (FirstNet) is operated by the United States National Telecommunication Information Administration. FirstNet operates to establish, operate, and maintain an interoperable public safety broadband network. The virtual controller 220 may have access FirstNet information or information from other networks.

In some embodiments, for example, the controller 224 for high priority services may identify a first responder situation based on information from emergency communication systems or one or more dedicated high priority communication systems. For example, the controller 224 for high priority services may monitor voice communications among first responder personnel to identify a first responder situation. The controller 224 for high priority services may use certain keywords such as emergency codes and addresses to identify a first responder situation. Further, the controller 224 for high priority services may use machine learning or artificial intelligence to identify the first responder situation, such as using pattern matching neural networks to identify the first responder situation.

The camera equipment 226 may include one or more cameras that have a view of an area such as the service area 210. The camera equipment 226 may include any suitable equipment for capturing one or more images of the area such as a still camera or a video camera that capture visible light or an infra-red camera, and others. The camera equipment 26 may include combinations of cameras and camera information from a variety of sources, such as public security cameras maintained by, for example, police agencies, private security cameras maintained by private individuals or entities, or any other source.

The camera equipment 226 may provide to the virtual controller 220 image information in any suitable format or combination of formats. The virtual controller 220 may include an image processing system for converting received image information from a particular format to a single, consistent format. The image processing system of the virtual controller 220 may further operate to identify persons or situations in which high quality or high reliability communication may be useful or valued. For example, the image processing system of the virtual controller 220 may include a machine learning or artificial intelligence system that operates to identify such persons or situations. For example, a neural network may monitor image information and match patterns seen in the visual information with training data. In another example, the image information may be generally static and unchanging including a persistent view of an area such as the service area 210. The image processing system of the virtual controller 220 may identify or be triggered by changes in the image information that cause closer scrutiny to detect and analyze the changes in the view seen by the camera equipment 226, such as a person in distress.

The location and movement sensing equipment 228 may operate to identify location information for persons, devices and other objects in a scene such as in the service area 210. For example, a user carrying a mobile device may be detected in the scene and location information may be provided to the virtual controller 220, along with identification information if available. For example, a mobile device such as first mobile device 206B or second mobile device 208B may include a Global Positioning System (GPS) receiver for determining GPS coordinates and then report those to a network. Alternately, the location and movement sensor may receive image information from the camera equipment 226 and use the image information to determine location of the user or the mobile device, such as by triangulation with an object having a known location. Further, as the user and the mobile device move through an area such as the service area, the location information may be regularly updated to determine movement information. The user's direction of motion and speed of motion may be determined and tracked by the location and movement sensing equipment 228 and may be used to predict future locations of the user and the mobile device.

The traffic sensing equipment 230 may include devices and systems configured to provide information about vehicular traffic in an area such as the service area 210. For example, some regions have public or facilities that collect traffic information and make the traffic information available to other users. Such traffic information may include real time, current or historical information about traffic volumes in particular areas, average speeds of vehicular traffic and an indication whether traffic congestion is building or declining. In other examples, traffic information may come from one or more camera systems positioned near roadways to provide a current view of traffic conditions. The traffic sensing equipment 230 may analyze images or video feeds to develop traffic information for a particular location. The traffic sensing equipment 230 may access such traffic information and provide such traffic information to the virtual controller 220 to identify and prioritize users and devices such as first user 206A with first mobile device 206B or second user 208A with second mobile device 208B.

The temperature sensing equipment 232 may include a plurality of sensing devices to provide environmental information including temperature information to the virtual controller 220. For example, the temperature sensing equipment 232 may include infrared sensors that can detect relative temperature information for mobile devices such as first mobile device 206B and second mobile device 208B. The temperature sensing equipment 232 may be positioned in any suitable location near or in an area such as service area 210. The information provided by the temperature sensing equipment 232 may be an estimate of an absolute temperature, such as 45 degrees Celsius for a particular mobile device, or a relative indication of temperature, such as first mobile device 206B is operating a little bit hotter or much hotter than second mobile device 208B, time varying information, such as a particular mobile device is heating up over time as the device is being used.

In addition to temperatures, the temperature sensing equipment may provide information about any suitable environmental conditions, such as sound including sound volume, gas concentrations such as carbon monoxide or carbon dioxide, and others. In some embodiments, the temperature sensing equipment 232 may include internet of things (IoT) devices which collect and report information about the environment.

In embodiments, the controller 224 for high priority services, the camera equipment 226, the location and movement sensing equipment 228, the traffic sensing equipment 230 and the temperature sensing equipment 232 communicate with the virtual controller 220 in any suitable fashion. Communication may be over wireline connections such as Ethernet cables or coaxial cables. Communication may be over wireless connections. Communications may be over one or more networks including the public internet using, for example, packetized data.

The virtual controller 220 receives input information including input information from the sensors 222. The virtual controller 220 in embodiments performs a comprehensive analysis of users and user devices in a current situation or location, such as the service area 210. The virtual controller 220 does not look at a single factor, such as packet loss, as is the case in conventional antenna beamforming. Rather, the virtual controller 220 looks at a full, comprehensive set of inputs from the sensors 222 and any other suitable sources to assess the overall situation. The virtual controller 220 operates in conjunction with other components of the mobility network to decide where antenna energy should be focused, or what is the most important location to direct a beam toward by a cell site or base station. Users or devices or activities may be prioritized by the virtual controller 220 and one or more antenna beams may be focused based on the prioritization. Focusing the beam to an area includes a consideration of the totality of activities in an area or at a specific location.

Figure 2B:
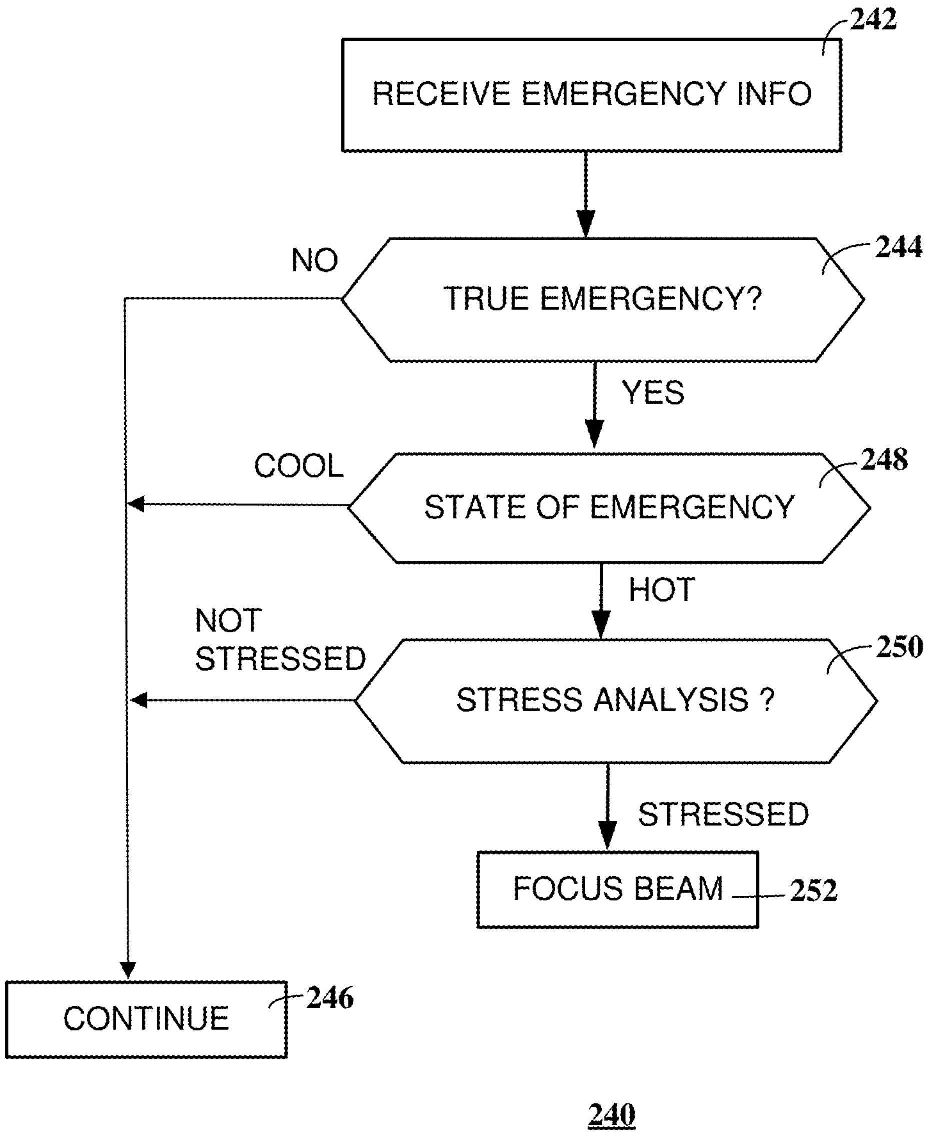

FIG. 2B depicts an illustrative embodiment of a method 240 in accordance with various aspects described herein. The method 240 may be performed by the virtual controller 220 to consider the totality of activities in a situation and determine if an emergency exists and requires response. In particular, the virtual controller 220 may include a processing system and a memory storing instructions and data to implement the method 240.

As indicated, the decision to provide a beam to a user, a mobile device, or an area, with a strong radio signal, is based on a consideration of the totality of circumstances. The totality of circumstances in this context means all information about devices and people and geographic locations and the mobility network that may be pertinent to assignment of a beam of a beamforming antenna, and which information is available. Examples include information about the area where the mobile device is operating, information about the mobile device and other mobile devices operating in the area or on the network, and information about activities occurring or predicted to occur in the area where the mobile device is operating. Such information may be available from within the mobility network or from sources outside the mobility network, such as traffic management sources, security camera sources, environmental sensor sources. However, if the information exists but is not available for evaluation, such a private video camera information that is inaccessible, such information is not part of the totality of circumstances for the analysis. The totality of circumstances analysis is in contradistinction to a conventional beam assignment that is based solely on mobile device location and swarming, where conventional swarming pertains to existence of a relatively large number of users in a particular location.

Method 240 may be initiated when a demand for mobile communication resources of a mobility network exceeds current availability of mobile communication resources of the mobility network. For example, if just a few users and user devices are in a geographic area, such as service area 210 of FIG. 2A, the mobility network generally has adequate bandwidth, data throughput and other communication resources to adequately support the users and user devices. However, if the number of users in the area grows, the amount of data traffic through the network may cause some degradation of performance for some or all users. Moreover, some users such as first responders may have a heightened requirement for high-reliability, high-speed, high-quality of services at that time. In accordance with various aspects herein, system and methods enable prioritizing some users over others to manage and make available scarce mobile communication resources to the prioritized users.

At step 242, the virtual controller 220 performing the method 240 may receive information and data from other sources such as sensors 222. In particular, the virtual controller 220 may receive information from the controller 224 for high priority services, the camera equipment 226, the location and movement sensing equipment 228, the traffic sensing equipment 230 (FIG. 2A) and process the received information.

At step 244, it is determined if a true emergency exists. For example, camera information may indicate that several emergency or first responder vehicles, including fire trucks and ambulances, are at a scene or a common location. Information from the controller 224 for high priority services may indicate that no true emergency exists but that the vehicles are gathered for a holiday parade. In that case, control proceeds to step 246 and processing continues, awaiting further information.

On the other hand, at step 244, additional information may indicate that a true emergency situation is occurring. For example, information from the controller 224 for high priority services may indicate substantial radio traffic among first responders in the same area. The virtual controller 220 or the controller 224 for high priority services may process the voice traffic, such as by a speech recognition routine, and determine that words such as “fire” and “victims” are being used. Based on the additional information, step 244 may conclude that a true emergency does exist.

Responsive to a conclusion that a true emergency does exist, control proceeds to step 248 where a state of the emergency is estimated. In embodiments, the emergency may be categorized based on input information. For example, the virtual controller 220 may conclude that the emergency is just emerging or developing. Alternatively, the virtual controller 220 may conclude that additional resources are required, such as additional communication resources. Still further, the virtual controller 220 may conclude that the emergency is under control with the currently available resources.

To categorize the emergency or to draw a conclusion about the state of the emergency, the virtual controller may receive and process additional information from other sources such as sensors 222. For example, the site of the emergency may be covered by cameras of the camera equipment 226 (FIG. 2A) or environmental sensors of the temperature sensing equipment 232 may provide useful information for categorizing the emergency.

In FIG. 2B, two categories of “hot” and “cool” are illustrated. In other examples, the emergency may be processed into as many categories as necessary or appropriate. If, at step 248, it is concluded that the emergency is cool or under control by on-site first responders, control proceeds to step 246 and processing continues, awaiting further information. This may be the case, for example, if the emergency appears to be just emerging and its scope cannot yet be discerned, of if camera information or information from the controller 224 for high priority services indicates that the first responder personnel are standing down because the emergency situation is under control.

On the other hand if at step 248, it is concluded that the emergency is hot or accelerating or still involved, method 240 includes a procedure of analyzing stress levels of individuals on the scene. For example, the virtual controller 220 may access camera information to view and assess behavior of persons present or facial expressions of persons present. Artificial intelligence may be used, for example, to compare observed actions of persons or their facial expressions with training data for individual behavior and expressions. In another example, voice information from the controller 224 for high priority services may be analyzed to determine stress levels of first responder personnel communicating over radio equipment at the site. The method 240 may use any suitable standard for assigning a value to an apparent stress level, based on visual, audible or other information.

If, at step 250, the method 240 concludes the apparent stress level is relatively low, the method 240 may conclude that the emergency does not warrant further attention. In that case, control proceeds to step 246 and processing continues, awaiting further information.

On the other hand, if, at step 250, the method 240 concludes the apparent stress level is relatively high, the method 240 may conclude that high reliability, high quality communication resources should be assigned to the emergency situation. At step 252, the method 240 includes a process of focusing one or more beams of a beamforming antenna on the site to provide the needed communication resources. For example, the virtual controller 220 may communicate with equipment of a mobility network to cause one or more base stations serving the area of the emergency situations to assign one or more beams to communication with mobile devices at the area. Further, if the information from the controller 224 for high priority services or one of the other sensors 222 identifies one of the first responders on the site, or an emergency manager at the site, the virtual controller 220 may provide that identification information to the mobility network so that a beam can be focused on the downlink to the mobile device of a responsible person on the scene.

Thus, method 240 illustrates the situational analysis associated with assigning an antenna beam to an emergency. The situation is more complicated than the presence of multiple emergency vehicles. The method 240 includes collected a variety of information from a variety of sources and analyzing the information together. The method 240 draws conclusions based on the received information, for example by categorizing emergencies by type or behavior by type.

FIG. 2C depicts an illustrative embodiment of a method 254 in accordance with various aspects described herein. The method 254 may be performed by the virtual controller 220 (FIG. 2A) to consider the totality of activities in a situation and predict, based on a user's position and movement, whether the user may need to be given a high priority for communication services. In particular, the virtual controller 220 may include a processing system and a memory storing instructions and data to implement the method 254.

At step 256, the virtual controller 220 performing the method 254 may receive position information and data, movement information and data, or a combination, from other sources such as sensors 222. In particular, the virtual controller 220 may receive such position and movement information from the location and movement sensing equipment 228. For example, the position and movement information may be based on GPS coordinates of a mobile device associated with the user. The position and movement information may be reported by the mobile device to the mobility network and then conveyed to the virtual controller 220 by devices of the mobility network.

Based on the position and movement information, at step 258, the virtual controller 220 may predict a future location of the mobile device and the user. The position and movement information may be combined with other information. For example, the virtual controller 220 may access a street map of an area to identify structures, facilities, obstacles and other features of the area. In another example, if the virtual controller 220 determines the mobile device and user are being transported on a bus, the virtual controller may access a map of bus routes for the area. The virtual controller 220 may then correlate motion of the mobile device, as reported in the position and movement information from the location and movement sensing equipment 228, with location on the map of the route for the bus. The prediction of step 258 may be based on a variety of information from a variety of sources.

In another example, the virtual controller 220 may determine whether a user or device is progressing on a routine route, under routine circumstances, versus a non-routine route or under non-routine circumstances. If a first responder vehicle is progressing down city streets at a normal rate of speed, the virtual controller 220 may conclude that a normal situation exists. On the other hand, if the first responder vehicle is operating at a high rate of speed, driving through traffic signals and the wrong way on one-way streets, the virtual controller 220 may conclude the first responder vehicle is rushing to an emergency situation. In this example, the virtual controller 220 retrieves historical information about how vehicles travel in particular locations to make a prediction about future travel by the vehicle.

In step 260, the method 254 includes a determination if the user will require enhanced communication resources such as a focused beam from a beamforming antenna. The position and movement information may be combined with information from other sources, such as camera information or traffic information. For example, the location and movement sensing equipment 228 may report the location of the user and mobile device and the traffic sensing equipment 230 may report congested traffic in the area ahead of the bus on its current route. Based on this information, the virtual controller 220 may predict that the user will need enhanced communication resources. In another example, the virtual controller may have access to personal information of the user, such as the user's calendar, which may indicate high-priority communication requirements. Thus, if the user is apparently about to be impeded by traffic while riding a bus, and the user's calendar indicates and important video call is imminent, the virtual controller may conclude that a focused beam should be assigned to the user and the user's mobile device. Still further, in this situation, camera information may be accessed for the location of the bus to assess the user's stress level. A high level of stress may indicate that the user is anxious about missing the video call. The assessment of a high level of stress may add to the conclusion that a focused beam should be assigned to the user.

At step 262, if the method 254 concluded that a focused beam should be assigned to the user, the virtual controller cooperates with equipment of the mobility network to assign a beam from an appropriate beamforming antenna. On the other hand, if the method 254 concluded at step 260 that no focused beam is required for this user, control proceeds to step 264 and processing continues, awaiting further information.

FIG. 2D depicts an illustrative embodiment of a method 266 in accordance with various aspects described herein. The method 266 may be performed by the virtual controller 220 (FIG. 2A) to consider the totality of activities in a situation and identify, based on image information about a user, whether the user may need to be given a high priority for communication services. In particular, the virtual controller 220 may include a processing system and a memory storing instructions and data to implement the method 266.

At step 268, the virtual controller 220 performing the method 266 may receive camera information and data, movement information and data, or a combination, from other sources such as sensors 222. In particular, the virtual controller 220 may receive image information from the camera equipment 226. The image information may be in, for example JPEG (.jpg) format, MPEG (.mpeg, .mpg) format, Portable Network Graphic (.png) format, or some other format.

In embodiments, the virtual controller 220 may include an image processing system for converting received image information from a particular format to a single, consistent format. For example, first portions of the camera equipment 226 may provide image information in JPEG format and second portions of the camera equipment 226 may provide image information in MPEG format. The virtual controller 220 may convert one or both formats of image information to a common format for processing and evaluation together. The common format may be JPEG format, MPEG format or some other format. Conversion and use of a common format allows the virtual controller to process together all camera information to identify and monitor persons and objects captured in the images from the first portions of the camera equipment 226 and the second portions of the camera equipment 226. Such monitoring may include tracking a person or object from a first area viewed by the first portions of the camera equipment 226 to a second area viewed by the second portions of the camera equipment 226. If the first area and the second do not overlap, the camera information from the first portions of the camera equipment 226 and the second portions of the camera equipment 226 must be converted to a common format for image processing of the camera information.

Method 266 further includes a process of evaluating the camera information to identify users who should be given priority in accessing communication services. Step 270, step 276 and step 280 are shown as being processed in parallel. However, these steps and others may be performed in any order. At step 270, the method 266 includes a process of determining if a person whose image is captured in the camera information is distressed or in a distressed situation. In one example, captured images may indicated that a child on the street has fallen and a nearby adult is using a mobile device to place a call, such as a 911 call for emergency services. If the method 266 does not identify a distressed situation or individual in the camera information, control proceeds to step 272 and processing continues, awaiting further information. On the other hand, if the method 266 does identify distressed situation or individual in the camera information, at step 274, the method 266 determines to focus a beam from a beamforming antenna to an area including the distressed situation or person. For example, the virtual controller 220 may cooperate with other components of the mobility network to assign a beam for communication with the distressed person or another person associated with the distressed situation.

At step 276, the method 266 includes a process of determining a person's likely need for reliable communication services based on a facial expression, body posture or other physical characteristic of a person whose image is captured in the camera information. For instance, a person may appear tense or stressed, or have a serious, anguished or upset facial expression. In another example, the person may be pacing rapidly, or moving arms in an agitated fashion. The method 266 may include processing the camera information to identify a state of agitation or tension. In embodiments, artificial intelligence such as a neural network may be used for pattern recognition in the camera information.

If the method 266 does not identify a distressed individual in the camera information at step 276, control proceeds to step 278 and processing continues, awaiting further information. On the other hand, if the method 266 does identify a distressed individual in the camera information, at step 274, the method 266 determines to focus a beam from a beamforming antenna to an area including the distressed person. For example, the virtual controller 220 may cooperate with other components of the mobility network to assign a beam for communication with the distressed person.

At step 280, the method 266 includes a process of determining if a person is likely to need reliable communication services based on a look of discomfort of a person whose image is captured in the camera information. For instance, a person may appear to look at the person's mobile device to check signal quality (for example, to see a number of bars displayed on the user interface of the mobile device as an indication of relative signal strength received by the mobile device. In another example, the user may be holding the device up or waving it around to try to get better signal quality. In yet another example, the person's mouth movements and other actions may indicate a sense of discomfort or frustration, such as turning around in a circle to obtain stronger signal.

If the method 266 does not identify an uncomfortable individual in the camera information at step 280, control proceeds to step 281 and processing continues, awaiting further information. On the other hand, if the method 266 does identify an uncomfortable individual in the camera information, at step 274, the method 266 determines to focus a beam from a beamforming antenna to an area including the uncomfortable person. For example, the virtual controller 220 may cooperate with other components of the mobility network to assign a beam for communication with the uncomfortable person.

The totality of circumstances or activities that is evaluated may include other aspects as well. For example, if a user is making an important business call, the high priority assigned to the call is a circumstance to be considered when deciding to assign a beam from a beamforming antenna to the call.

Figure 2E:
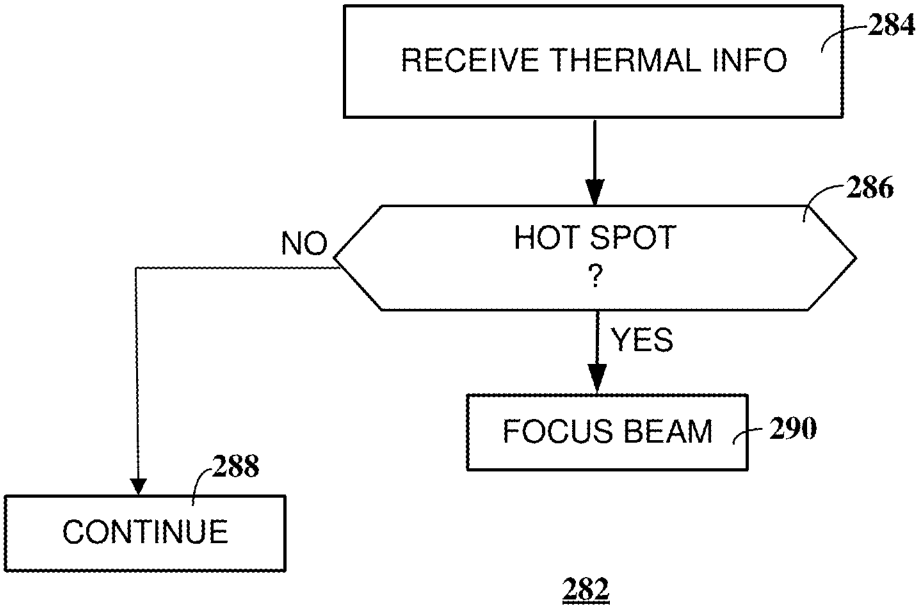

FIG. 2E depicts an illustrative embodiment of a method 282 in accordance with various aspects described herein. The method 282 may be performed by the virtual controller 220 (FIG. 2A) to consider the totality of circumstances in a situation and identify, based on a mobile device's thermal signature, whether the mobile device and its user may need to be given a high priority for communication services. In particular, the virtual controller 220 may include a processing system and a memory storing instructions and data to implement the method 282.

At step 284, the virtual controller 220 performing the method 282 may receive thermal information and data from other sources such as sensors 222. In particular, the virtual controller 220 may receive thermal information from temperature sensing equipment 232 (FIG. 2A). For example, the virtual controller 220 may receive a wide variety of environmental information including temperature information or thermal information. In embodiments, the temperature sensing equipment 232 may include infrared sensors that can detect relative temperature information for mobile devices such as first mobile device 206B and second mobile device 208B.

At step 286, the method 282 includes identifying in the thermal information an area or a mobile device having an elevated temperature. The elevated temperature may indicate that the device is highly active and had substantial data to transmit. For example, when the mobile device is transmitting data, the transmitter circuit of the mobile device is consistently keyed up, and the transmitter circuit is one of the highest-power circuits of the mobile device. The high-power operation causes the device to heat up and the higher temperature, relative to other objects in the environment may be detected by the temperature sensing equipment 232. The high-temperature condition may be reported by the temperature sensing equipment 232 to the virtual controller 220 and indicate to the virtual controller 220 that the particular mobile device should be prioritized for high speed, high reliability communications.

At step 286, the virtual controller 220 may determine from the thermal information if there is an area of elevated temperature. This may be done in any suitable manner. For example, the virtual controller 220 may receive location information for the area of elevated temperature from the temperature sensing equipment 232. The virtual controller 220 may also receive image information from the camera equipment 226 and correlate the location information of the area of elevated temperature with objects such as a mobile device that may be observed in the image information. Alternatively, the thermal information may provide an absolute or relative indication of the temperature. If the indication of temperature exceeds a temperature threshold, such as 45 degrees Celsius for a particular mobile device, the virtual controller 220 may conclude the particular mobile device should receive high speed, high reliability communication service.

If the method 282 does not identify relatively warm or hot device or area in the thermal information at step 285, control proceeds to step 288 and processing continues, awaiting further information. On the other hand, if the method 282 does identify a relative hot device or area, at step 290, the method 282 determines to focus a beam from a beamforming antenna to an area including the heated device. For example, the virtual controller 220 may cooperate with other components of the mobility network to assign a beam for communication with the heated device.

In another example, a user or user's mobile device may have a particular configuration that indicates the user should get relatively high priority for communications. For example, a user or user device may be operated by a high priority service such as FirstNet which is a communications network for first responders. The virtual controller 220 may retrieve or receive registration information for a user. The registration information may indicate the user is a high-priority user. For example, if the user or the user's device is registered as a FirstNet responder, the virtual controller 220 may designate the user or user device as high priority communications. Such high priority communications may correspond to directing a beam to the user or the user's device.

Moreover, some high priority services such as FirstNet may have priority classes. For example, a police officer on patrol may not have a lower priority class than a firefighter, and the firefighter may in turn have a lower priority than a commander of the fire brigade. If, at some time, there are limitations on coverage, an arbiter such as the virtual controller would prioritize based on membership in the high priority organization such as FirstNet and also the user's class within FirstNet.

In some cases, multiple cells may be used cooperate to ensure that an area such as the service area 210 receives proper coverage. The virtual controller 220 may operate to cover the service area fully with high-reliability beams. Further, the virtual controller 220 may operate to distribute coverage to adjacent cells or portions of cells to the extent possible. For example in FIG. 2A with two cell sites as an example, the first cell site 202 and the second cell site 204 cooperate with the virtual controller to ensure the service area 210 receives adequate beam coverage. Each respective cell site may provide a beamformed carrier to the service area 210 and the respective carriers may be combined at the mobile device to improve data transfer rates or throughput.

The virtual controller 220 cooperates with the cell sites to take into consideration the totality of circumstances to provide high quality, high reliability coverage to the service area 210 to the area where users need a strong signal. The virtual controller 220 receives as inputs information about the type of user (such as a high-priority user), camera input including user expressions and body posture as well as activities like an existing car accident.

The list of inputs described herein is not intended to be an exhaustive list of the totality of circumstances the virtual controller may use to determine priorities for beamforming communications. Other examples include pedestrian sensors or radar systems that detect the presence or absence of pedestrians in an area, or detect that pedestrians are running to a particular area. The action of running toward a common destination by multiple pedestrians may indicated a need for high quality, high reliability communications at that immediate time, and the virtual controller may assign one or more beams from a beamforming antenna to that area.

In another example, a mobile device such as first mobile device 206B or second mobile device 208B, may be specially equipped with hardware or software to enable the mobile device to specifically request high speed, high reliability communications. For example, a particular application (app) may be installed on the first mobile device 206B to enable the application and the first mobile device 206B to automatically request a high speed or high reliability application.

The application may be authorized based on any suitable criteria. For example, if the first mobile device 206B is assigned to a high priority individual or a first responder, the application may be installed and activated to enable the high priority individual to automatically request a high-speed communication link on a beamforming antenna.

Figure 2F:
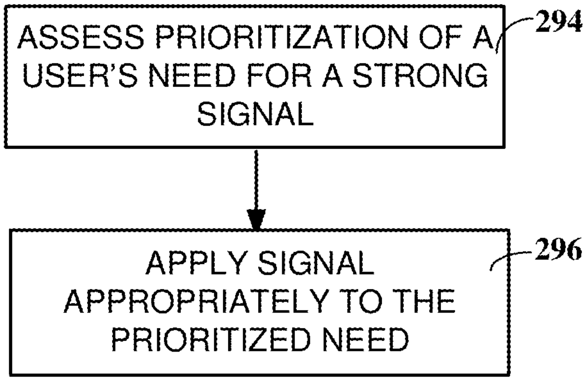

FIG. 2F depicts an illustrative embodiment of a method 292 in accordance with various aspects described herein. The method 292 may be performed by equipment of a mobility network such as the virtual controller 220 and one or more cell sites of a mobility network (FIG. 2A) to consider the totality of circumstances in a situation and assign a relatively strong signal to a user. Method 292 may be initiated when a demand for mobile communication resources of a mobility network exceeds current availability of mobile communication resources of the mobility network.

In step 294, the method 292 includes operations to assess the prioritization of a particular user's need for a strong signal from the mobility network. In examples, the strong signal may be a signal having relatively high reliability, such as having a packet loss below a predetermined packet loss threshold. The strong signal may be a signal having a relatively high data throughput, such as a data throughput exceeding a predetermined throughput threshold. In another example, the strong signal may have a quality of service (QOS) parameter exceeding a predetermined QoS threshold. In some examples, the strong signal is provided by one or more base stations or cell sites that employ a beamforming antenna to direct a beam on a downlink to the user and the user's mobile device. The beam in effect concentrates transmission energy in a relatively small area to provide a best available received signal strength at the mobile device.

The prioritization of the user's need for a strong signal may be based on any suitable factors. In accordance with various aspects described herein, the prioritization is based on a totality of circumstances for the user and the mobility network. Some circumstances include the occurrence of an emergency condition which justifies a high priority for the user. Other circumstances include the user's status as a first responder or a business person needing to make an important call. Other circumstances include the user's current situation as reflected in particular agitation, facial expressions, apparent stress level, etc. Other circumstances include location and movement of the user as well as vehicular traffic on roads near the user. Other circumstances include an amount of data traffic in the network serving the user. For example, if suitable data throughput in the network cannot be provided on a backhaul connection from a cell site to the network core, providing a strong signal from the cell site to the user may not warrant a high priority.

Prioritization at step 294 may include prioritization multiple users. Any suitable prioritization may be used. For example, first responders may be prioritized over emergency situations, where the emergency situation is only deduced from camera information or pedestrian activity. Further, a business call may be prioritized lower than a first responder or emergency call.

Once prioritization has been performed at step 294, available strong signals may be applied to the circumstances according to the prioritization. For example, in a particular cell, only a predetermined number of strong signals, such as only three beamformed downlink signals, may be provided to a particular area such as service are 210. The three strong signals may be assigned by the mobility network or the virtual controller 220 to the three highest priority users. In an example, the three highest priority users are all first responders including a fire battalion commander, a firefighter and a police sergeant. They will receive strong signals to provide relatively fast, high-reliability communications in the service area 210. Other examples can be readily imagined.

In alternative embodiments, the method 292 may include further include collecting additional information about the totality of circumstance. For example, an emergency situation may vary over time, as the situation initially emerges and becomes apparent and more first responders attend to the emergency, then later fewer first responders are present as the emergency is under control. In this example, step 294 and step 296 may be operated in a loop to update the assignment of radio assets such as a strong signal based on the timewise variation of circumstances.

The method 292 of FIG. 2E has particular application in a situation where an area of a radio access network (RAN) footprint begins to experience radio resources limitations where the radio signal cannot cover 100 percent of users in the footprint adequately. In that case, the radio must reallocate or focus the bandwidth of the radio or the energy of the radio where it is most needed. Not all subscribers in a radio footprint are able to access all RAN resources required to communicate adequately. The method 292 provides a way to allocate the beam that is a scarce resource of the radio. Other, non-prioritized users will experience a situation similar to a radio network with heavy traffic. There may be some delay in performing downloads due to reduced bandwidth, for example.

While for purposes of simplicity of explanation, the respective processes are shown and described as a series of blocks in FIG. 2B, FIG. 2C, FIG. 2D, FIG. 2E and FIG. 2F it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
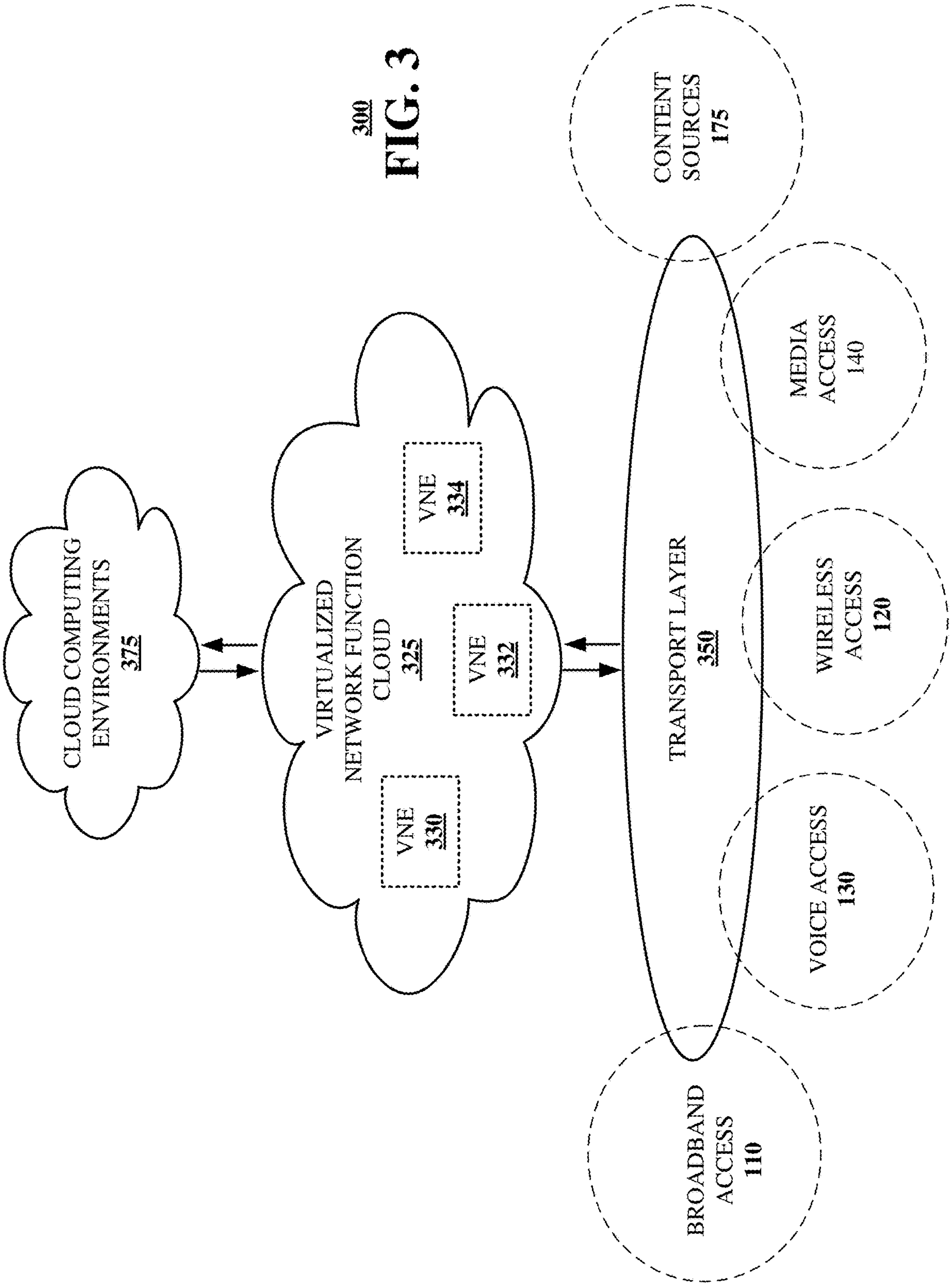
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of system 200, and method 240, method 254, method 266, method 282 and method 292 presented in FIGS. 1, 2A, 2B, 2C, 2D, 2E, 2F and 3. For example, virtualized communication network 300 can facilitate in whole or in part activating and shaping antenna beamforming at a cell site of a mobility network based on a totality of circumstances that are pertinent to the location and users in the mobility network.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
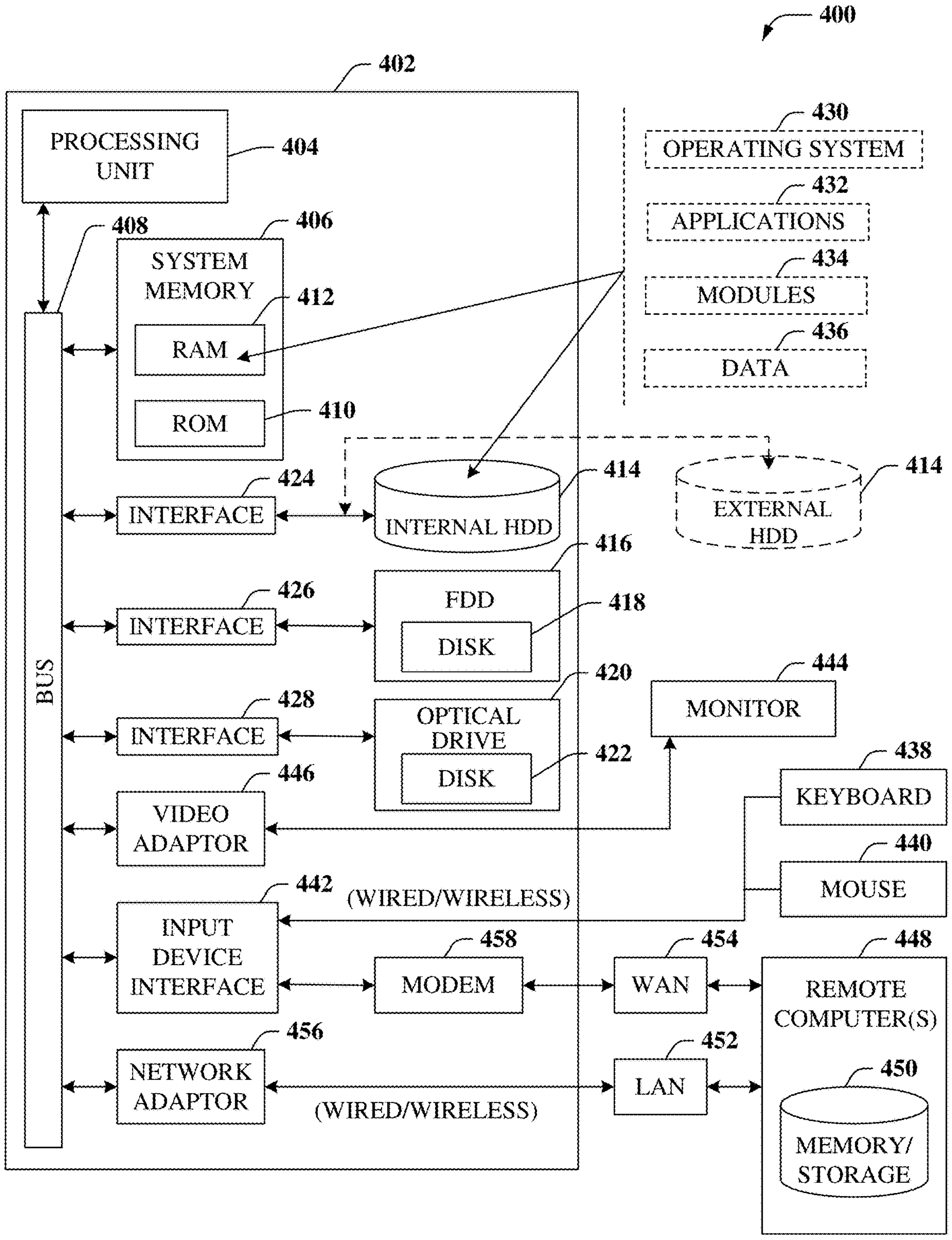
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part activating and shaping antenna beamforming at a cell site of a mobility network based on a totality of circumstances that are pertinent to the location and users in the mobility network.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies.

Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
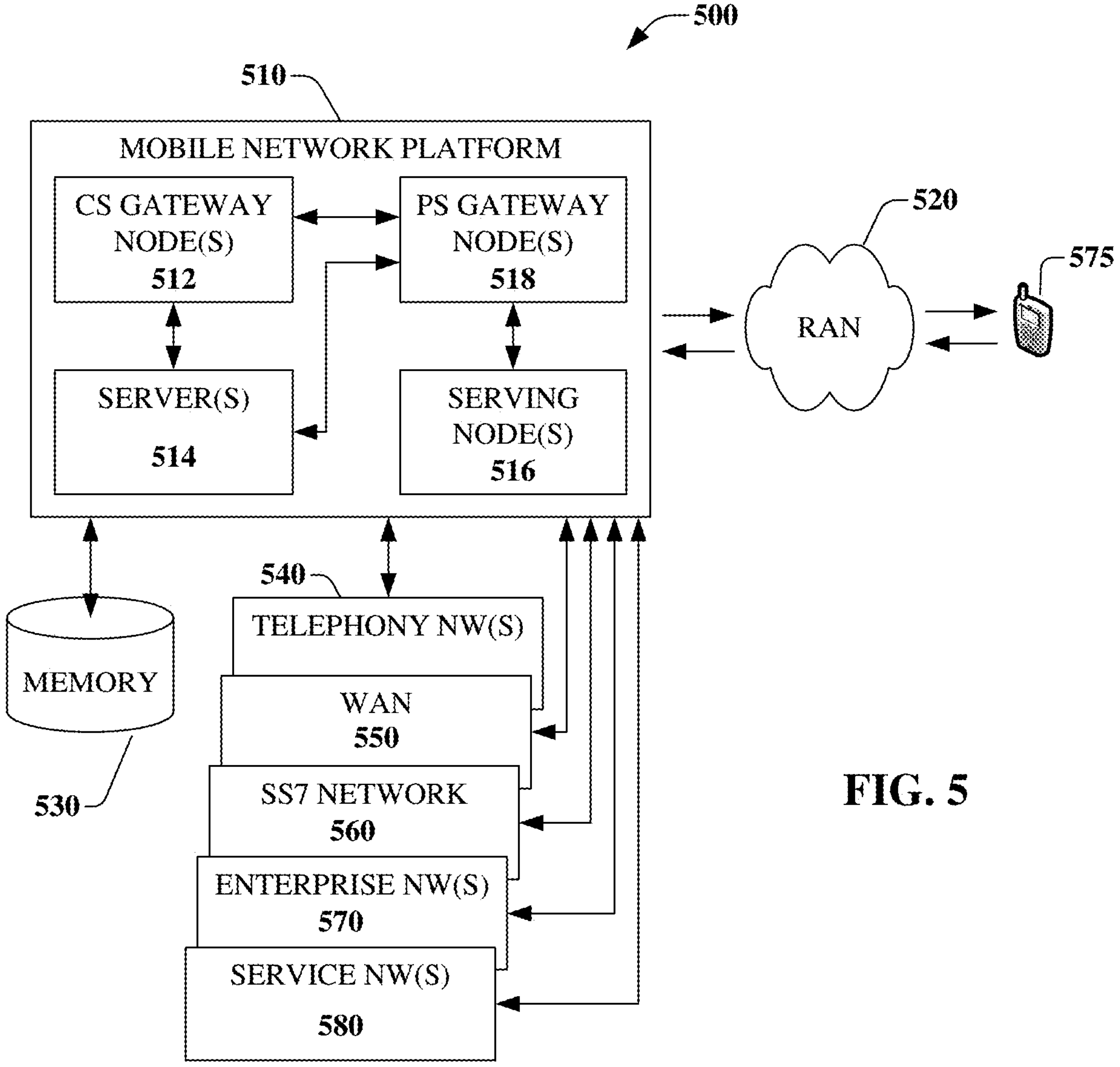
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part activating and shaping antenna beamforming at a cell site of a mobility network based on a totality of circumstances that are pertinent to the location and users in the mobility network. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
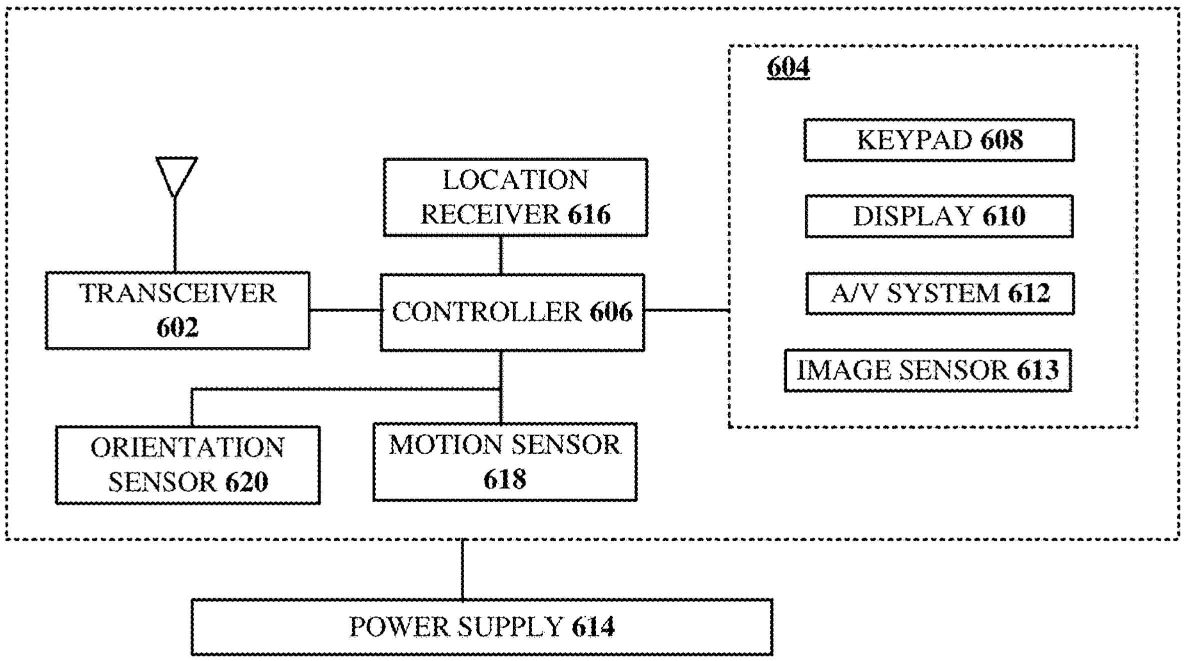
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part activating and shaping antenna beamforming at a cell site of a mobility network based on a totality of circumstances that are pertinent to the location and users in the mobility network.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBec®, Wi-Fi, DECT, or cellular communication technologies, just to mention a few (Bluetooth® and ZigBee® are trademarks registered by the Bluetooth® Special Interest Group and the ZigBec® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human car) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi_33, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms “first,” “second,” “third,” and so forth, as used in the claims, unless otherwise clear by context, is for clarity only and doesn’t otherwise indicate or imply any order in time. For instance, “a first determination,” “a second determination,” and “a third determination,” does not indicate or imply that the first determination is to be made before the second determination, or vice versa, etc.

In the subject specification, terms such as “store,” “storage,” “data store,” data storage,” “database,” and substantially any other information storage component relevant to operation and functionality of a component, refer to “memory components,” or entities embodied in a “memory” or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, X=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms “component,” “system” and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) “operably coupled to”, “coupled to”, and/or “coupling” includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

identifying a requirement for mobile communication resources in a service area of a mobility network;

determining the requirement for mobile communication resources exceeds currently available mobile communication resources of the mobility network for the service area;

assessing current user status information for one or more users in the service area, forming a user assessment, wherein the assessing current user status information is based on the determining the requirement for mobile communication resources exceeds currently available mobile communication resources, wherein the assessing current user status information comprises identifying a first user having high-priority as a high-priority user and a second user at the service area, the service area being served by a cell site of the mobility network, the first user and the second user being subscribers to mobile communication services on the mobility network, and wherein the identifying the first user and the second user is responsive to a totality of circumstances analysis of activities at the service area of the mobility network; and wherein the totality of circumstances analysis is performed responsive to the determining the requirement for mobile communication resources exceeds currently available mobile communication resources;

performing a first assignment of an antenna beam of a beamforming antenna based on the user assessment, wherein the performing the first assignment comprises assigning the antenna beam for downlink communication between the cell site of the mobility network and a first mobile device of the first user having high-priority; and performing a second assignment of the antenna beam of the beamforming antenna to a mobile device having a predetermined set of prioritized factors, wherein the predetermined set of prioritized factors is specific to the mobile device, wherein the performing the second assignment comprises assigning the antenna beam for downlink communication between the cell site of the mobility network and a second mobile device of the second user, the predetermined set of prioritized factors being specific to the second mobile device.

2. The device of claim 1, wherein the assessing current user status information comprises:

identifying a current public emergency situation affecting the service area; and identifying a current state of the current public emergency situation.

3. The device of claim 2, wherein the assessing current user status information comprises:

receiving camera information for the service area; and identifying a current amount of stress of the one or more users at the service area, wherein the identifying the current amount of stress is based on the camera information; and wherein the operations further comprise:

receiving image information in a predetermined format; and monitoring the received image information by using a neural network.

4. The device of claim 1, wherein the operations further comprise:

receiving user information about at least one user of the one or more users in the service area;

predicting a future action of the at least one user based on the user information; and assigning the antenna beam of the beamforming antenna based on the predicting the future action.

5. The device of claim 4, wherein the operations further comprise:

receiving position information and movement information of the at least one user; and predicting the future action of the at least one user based on the position information and movement information.

6. The device of claim 1, wherein the operations further comprise:

receiving camera information including an image of at least one user of the one or more users in the service area;

identifying, from the camera information, the at least one user as a user who should be given priority for available mobile communication resources; and assigning the antenna beam of the beamforming antenna based on the identifying.

7. The device of claim 6, wherein the identifying the at least one user as a user who should be given priority comprises:
identifying, from the camera information, a distressed situation involving the at least one user, wherein the at least one user comprises the first user having high-priority; and
identifying, from the camera information, a distressed emotion of the at least one user.

8. The device of claim 6, wherein the identifying the at least one user as a user who should be given priority comprises:
identifying, from the camera information, a facial expression of the at least one user; and
assigning the antenna beam of the beamforming antenna based on the facial expression, wherein the assigning comprises performing the first assignment.

9. The device of claim 1, wherein the operations further comprise:
receiving thermal information from an environmental sensor located in the service area;
based on thermal information, identifying a mobile device having an elevated temperature; and
assigning the antenna beam of the beamforming antenna to the mobile device having the elevated temperature by performing the first assignment.

10. The device of claim 1, wherein the operations further comprise:
receiving registration information for a user, wherein the user is registered as a high-priority user; and
assigning the antenna beam of the beamforming antenna to a mobile device the user registered as the high-priority user, wherein the user comprises the first user having high-priority.

11. A non-transitory machine-readable medium, comprising executable instructions that, when executed by a processing system including a processor, facilitate performance of operations, the operations comprising:
identifying a first user having high-priority as a high-priority user and a second user at a service area of a mobile communications network, the service area being served by a cell site of the mobile communications network, the first user and the second user being subscribers to mobile communication services on the mobile communications network,
wherein the identifying the first user and the second user is responsive to a determination that a demand for mobile communication resources exceeds an amount of available mobile communication resources, and
wherein the identifying the first user is responsive to a totality of circumstances analysis of activities at the service area of the mobile communications network;
assigning an antenna beam of a beamforming antenna for downlink communication between the cell site of the mobile communications network and a first mobile device of the first user having high-priority; and
assigning the antenna beam of the beamforming antenna for downlink communication between the cell site of the mobile communications network and a second mobile device of the second user, the second mobile device having a predetermined set of prioritized factors, wherein the predetermined set of prioritized factors is specific to the second mobile device.

12. The non-transitory machine-readable medium of claim 11, wherein the operations further comprises:
receiving camera information for the service area; and
monitoring the received camera information by using a neural network.

13. The non-transitory machine-readable medium of claim 11, wherein the operations further comprise:
receiving position information for a particular user;
predicting, based on the position information, a future location of the particular user; and
identifying the particular user as the high-priority user.

14. The non-transitory machine-readable medium of claim 11, wherein the operations further comprise:
collecting available information about devices and people and geographic locations and the mobile communications network that may be pertinent to assignment of a beam of the beamforming antenna, forming collected information; and
performing a totality of circumstances analysis on the collected information to prioritize users according to a need of the users for a strong signal for downlink communication between the cell site of the mobile communications network and mobile devices.

15. The non-transitory machine-readable medium of claim 11, wherein the operations further comprise:
receiving thermal information from one or more thermal sensors at the service area;
identifying in the thermal information an area having an elevated temperature or a mobile device having an elevated temperature; and
identifying as the first user a user associated with the area having an elevated temperature or a user associated with the mobile device having an elevated temperature.

16. A method, comprising:
assessing, by a processing system including a processor, a priority of a first user at a service area in a mobile communications network for a strong radio signal from a cell site of the mobile communications network;
providing, by the processing system, the strong radio signal to a mobile device of the first user according to the priority of the first user, wherein the providing the strong radio signal comprises focusing an antenna beam of a beamforming antenna at the service area and assigning the antenna beam to the first user for downlink communication between the cell site of the mobile communications network and the first user; and
wherein the assessing the priority of the first user comprises:
receiving, by the processing system, camera information, the camera information including images of users including the first user at the service area in the mobile communications network; and
estimating, by the processing system, a state of the first user, wherein the estimating the state of the first user is based on the camera information; and
assigning the antenna beam of the beamforming antenna for downlink communication between the cell site of the mobile communications network and a second mobile device of a second user, the second mobile device having a predetermined set of prioritized factors, wherein the predetermined set of prioritized factors is specific to the second mobile device.

17. The method of claim 16, further comprising:
receiving image information in a predetermined format; and
monitoring the received image information by using a neural network.

18. The method of claim 16, wherein the providing the strong radio signal to the mobile device comprises:

providing, by the processing system, a radio signal having a data throughput exceeding a predetermined throughput threshold.

19. The method of claim 18, wherein the providing the strong radio signal to the mobile device comprises:

providing, by the processing system, a radio signal having a packet loss less than a predetermined packet loss threshold.

20. The method of claim 16, further comprising:

receiving camera information including images at the service area of the mobile communications network;

identifying an emergency situation at the service area of the mobile communications network, wherein the identifying the emergency situation is based on the camera information;

identifying a state of the emergency situation, wherein the identifying the state of the emergency situation is based on the camera information; and assigning the antenna beam of the beamforming antenna based on the state of the emergency situation.

* * * * *